United States Patent
Lee et al.

(10) Patent No.: US 10,241,617 B2
(45) Date of Patent: Mar. 26, 2019

(54) APPARATUS AND METHOD FOR OBTAINING COORDINATE THROUGH TOUCH PANEL THEREOF

(71) Applicant: Samsung Electronics Co., Ltd., Gyeonggi-do (KR)

(72) Inventors: Sung Jun Lee, Gyeonggi-do (KR); Jun Ik Lee, Gyeonggi-do (KR); Jung Hoon Kwon, Seoul (KR); Gyu Won Moon, Gyeonggi-do (KR); Bo Kyung Moon, Gyeonggi-do (KR); Jae Min Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 53 days.

(21) Appl. No.: 15/293,887

(22) Filed: Oct. 14, 2016

(65) Prior Publication Data
US 2017/0108992 A1    Apr. 20, 2017

(30) Foreign Application Priority Data
Oct. 14, 2015    (KR) .................. 10-2015-0143330

(51) Int. Cl.
*G06F 3/041*    (2006.01)
*G06F 3/044*    (2006.01)

(52) U.S. Cl.
CPC .......... *G06F 3/0418* (2013.01); *G06F 3/044* (2013.01); *G06F 3/0414* (2013.01); *G06F 2203/04105* (2013.01); *G06F 2203/04108* (2013.01)

(58) Field of Classification Search
CPC ........ G06F 3/044; G06F 3/0418; G06F 3/047; G06F 5/00
See application file for complete search history.

(56) References Cited

U.S. PATENT DOCUMENTS

| 6,977,646 | B1 | 12/2005 | Hauck et al. |
| 7,116,315 | B2 | 10/2006 | Sharp et al. |
| 7,395,717 | B2 | 7/2008 | DeAngelis et al. |
| 7,578,195 | B2 | 8/2009 | DeAngelis et al. |
| 7,639,238 | B2 | 12/2009 | Hauck |
| 8,581,867 | B2 | 11/2013 | Shin et al. |

(Continued)

FOREIGN PATENT DOCUMENTS

| JP | 56-56307 | 1/2015 |
| KR | 10-2009-0130563 | 12/2009 |

(Continued)

OTHER PUBLICATIONS

European Search Report dated Mar. 3, 2017 issued in counterpart application No. 16194001.0-1507, 6 pages.

*Primary Examiner* — Michael A Faragalla
(74) *Attorney, Agent, or Firm* — The Farrell Law Firm, P.C.

(57) ABSTRACT

An electronic device is provided. The electronic device includes a display, a first sensor, a second sensor, and a processor configured to obtain, using the first sensor, location information corresponding to an active area of the display, in response to contact between an external object and the display, obtain, using the second sensor, pressure information corresponding to a pressure applied to the display resulting from the contact between the external object and the display, and determine a validity of the location information based on whether the pressure information satisfies a designated condition.

15 Claims, 11 Drawing Sheets

(56) References Cited

U.S. PATENT DOCUMENTS

| | | |
|---|---|---|
| 8,823,678 B2 | 9/2014 | Li et al. |
| 8,875,037 B2 | 10/2014 | Kwon et al. |
| 9,542,904 B2 | 1/2017 | Yamaguchi et al. |
| 2004/0178998 A1 | 9/2004 | Sharp et al. |
| 2006/0202969 A1 | 9/2006 | Hauck |
| 2007/0248799 A1 | 10/2007 | DeAngelis et al. |
| 2008/0127739 A1 | 6/2008 | DeAngelis et al. |
| 2009/0313567 A1 | 12/2009 | Kwon et al. |
| 2011/0199327 A1* | 8/2011 | Shin .................. G06F 3/0418 345/173 |
| 2013/0176268 A1 | 7/2013 | Li et al. |
| 2014/0250391 A1 | 9/2014 | Jong et al. |
| 2015/0009160 A1 | 1/2015 | Cho |
| 2015/0370385 A1* | 12/2015 | Yamaguchi .......... G06F 3/044 345/174 |
| 2016/0092022 A1 | 3/2016 | Lee et al. |
| 2016/0259544 A1* | 9/2016 | Polikarpov ......... G06F 3/04886 |
| 2017/0083159 A1 | 3/2017 | Yamaguchi et al. |

FOREIGN PATENT DOCUMENTS

| | | |
|---|---|---|
| KR | 10-2014-0108993 | 9/2014 |
| KR | 10-2014-0126506 | 10/2014 |
| KR | 10-2015-0004638 | 1/2015 |
| KR | 10-2016-0036927 | 4/2016 |
| WO | WO 02/35460 | 5/2002 |
| WO | WO 03/049002 | 6/2003 |
| WO | WO 2007/094993 | 8/2007 |

* cited by examiner

APPARATUS AND METHOD FOR OBTAINING COORDINATE THROUGH TOUCH PANEL THEREOF

PRIORITY

This application claims priority under 35 U.S.C. § 119(a) to Korean Patent Application Serial No. 10-2015-0143330, which was filed in the Korean Intellectual Property Office on Oct. 14, 2015, the entire disclosure of which is incorporated herein by reference.

BACKGROUND

1. Field of the Disclosure

The present disclosure relates generally to a method and a device that recognizes a user input at an electronic device, and more particularly, to a method and a device that determine a ghost input by using information (e.g., pressure information) corresponding to a touch input.

2. Description of the Related Art

With the development of electronic technologies, various types of electronic products, such as a smartphone, a tablet personal computer (PC), or the like, have been developed and distributed.

The touch screen can use capacitive, resistive, and optical detecting methods based on an operating method of the electronic device that the touch screen is part of. In recent years, capacitive touch screens have been mainly used because the capacitive touch screens have high accuracy in touch recognition, low probability of malfunction, and possibility of multi-touch. The capacitive touch screens may recognize a touch input based on a variation of the amount of charge of an electrode included in a touch panel.

Since the capacitive touch screen recognizes a touch input based on a charge variation, a conductive foreign substance on a cover glass, such as water and the like, or a noise, such as an electromagnetic wave that passes through the touch screen and the like can cause a malfunction of the capacitive touch screen. The malfunction of the capacitive touch screen due to these foreign substances or the noise is sometimes referred to as a "ghost touch". Sometimes a touch driver can be configured to remove the ghost touch based on the duration of the touch input or a form of the touch input to prevent the ghost touch; however, this may result in reduced response speed and sensitivity of the touch screen.

SUMMARY

Aspects of the present disclosure have been made to address at least the above-mentioned problems and/or disadvantages and to provide at least the advantages described below. Accordingly, an aspect of the present disclosure is to provide a method and a device that determine a ghost input by using information (e.g., pressure information) corresponding to a touch input, without reducing a response speed or sensitivity of a touch screen. Another aspect of the present disclosure is to provide a method and a device that are capable of recognizing a user input of an electronic device.

In accordance with an aspect of the present disclosure, there is provided an electronic device. The electronic device includes a display, a first sensor, a second sensor, and a processor configured to obtain, using the first sensor, location information corresponding to an active area of the display, in response to contact between an external object and the display, obtain, using the second sensor, pressure information corresponding to a pressure applied to the display resulting from the contact between the external object and the display, determine a validity of the location information based on whether the pressure information satisfies a designated condition.

In accordance with an aspect of the present disclosure, there is provided an electronic device. The electronic device includes a touch panel configured to sense a touch input, a pressure sensor configured to sense a pressure applied by the touch input, and a processor configured to process data associated with the touch input received from a control circuit that is electrically connected to the touch panel and the pressure sensor and configured to obtain coordinates of the touch input and a pressure value corresponding to the touch input and provide the coordinates to the processor if the pressure value is greater than or equal to a threshold value and not provide the coordinates to the processor if the pressure value is less than the threshold value.

In accordance with an aspect of the present disclosure, there is provided a user input recognizing method of an electronic device. The method includes sensing a touch input, obtaining coordinates of the touch input and a pressure value corresponding to the touch input, and if the pressure value is greater than or equal to a threshold value, determining that the coordinates of the touch input are valid, to allow a function corresponding to the touch input to be performed.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
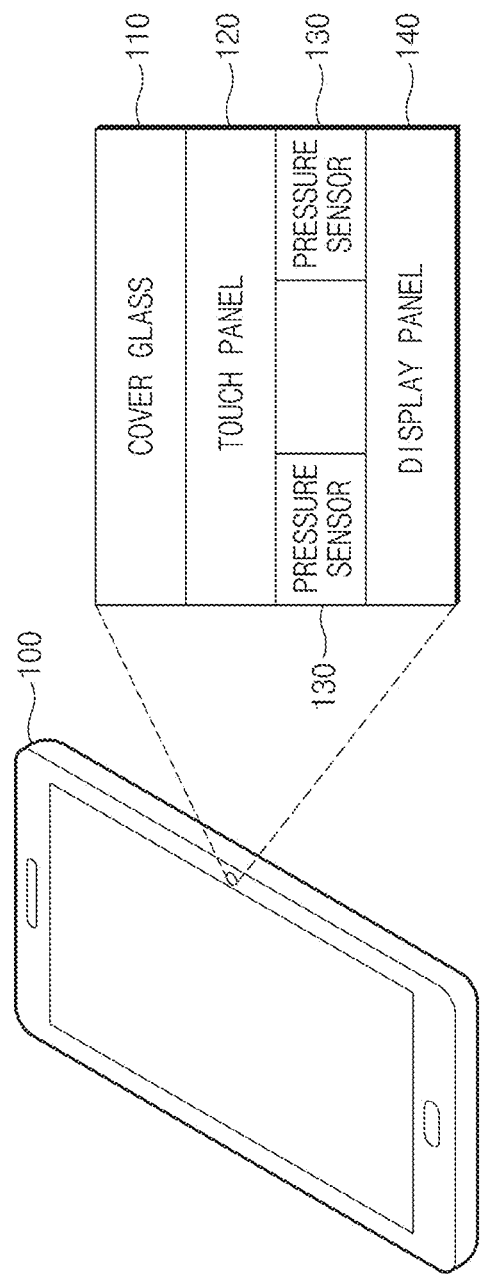
FIG. 1 is a diagram illustrating a configuration of an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a diagram illustrating a configuration of an electronic device, according to an embodiment of the present disclosure.

Referring to FIG. 1, an electronic device 100 includes a cover glass 110, a touch panel 120, a pressure sensor 130, and a display panel 140. The electronic device 100 may include a display module that includes the cover glass 110, the touch panel 120, the pressure sensor 130, and the display panel 140. For example, the touch panel 120 or the pressure sensor 130 may correspond to a part of the components of the display module. The touch panel 120 or the pressure sensor 130 may be embedded in the display module; the touch panel 120 may be referred to as a "first sensor", and a pressure sensor may be referred to as a "second sensor".

The first sensor or the second sensor may be any suitable type of sensors. For example, the first sensor or the second sensor may include a proximity sensor (e.g., a proximity sensor 1040G of FIG. 10) or an illuminance sensor (e.g., an illuminance sensor 1040K of FIG. 10).

The electronic device 100 may sense, for example, a touch input (e.g., a user input) through the touch panel 120. In the case where a conductor such as a user's finger, a stylus, or the like makes contact with the cover glass 110 or is adjacent to the cover glass 110, the electronic device 100 may recognize the touch input if the amount of charge is varied in the touch panel 120. In the case where the conductor makes contact with the cover glass 110, a pressure may be applied on the cover glass 110 by the touch input. The electronic device 100 may recognize the pressure applied on the cover glass 110 by the touch input by using the pressure sensor 130. In the case where the pressure sensor 130 senses the pressure, the electronic device 100 may process the touch input of the touch panel 120 as a valid input. The electronic device 100 may perform a function corresponding to the valid touch input.

In the case where a conductive foreign substance such as a water or the like exists on the cover glass 110 or in the case where a noise, which passes through the touch panel 120, such as an external electromagnetic wave is generated, the electronic device 100 may sense a touch input (e.g., a ghost touch) if there is a variation of the amount of charge in the touch panel 120. Since the above-mentioned touch input is not an intended input, the touch input by the conductive foreign substance or the noise may be disregarded. The touch input by the conductive foreign substance or the noise may not apply a pressure on the cover glass 110. Therefore, in the case where the pressure is not sensed through the pressure sensor 130 even though the touch input is sensed through the touch panel 120, the electronic device 100 may process the corresponding touch input as an invalid input. In the case where it is determined that the touch input is an invalid input, the electronic device 100 may recognize the touch input as the ghost touch and may not process the touch input. For example, the electronic device 100 may disregard (or remove) the invalid touch input. In the case where the touch input is disregarded, the electronic device 100 may not perform any operation for the invalid touch input.

While the pressure sensor 130 is illustrated in FIG. 1 as being arranged under the touch panel 120, the present disclosure is not limited thereto. For example, the pressure sensor 130 may be arranged on or over the touch panel 120 or in the touch panel 120.

Figure 2:
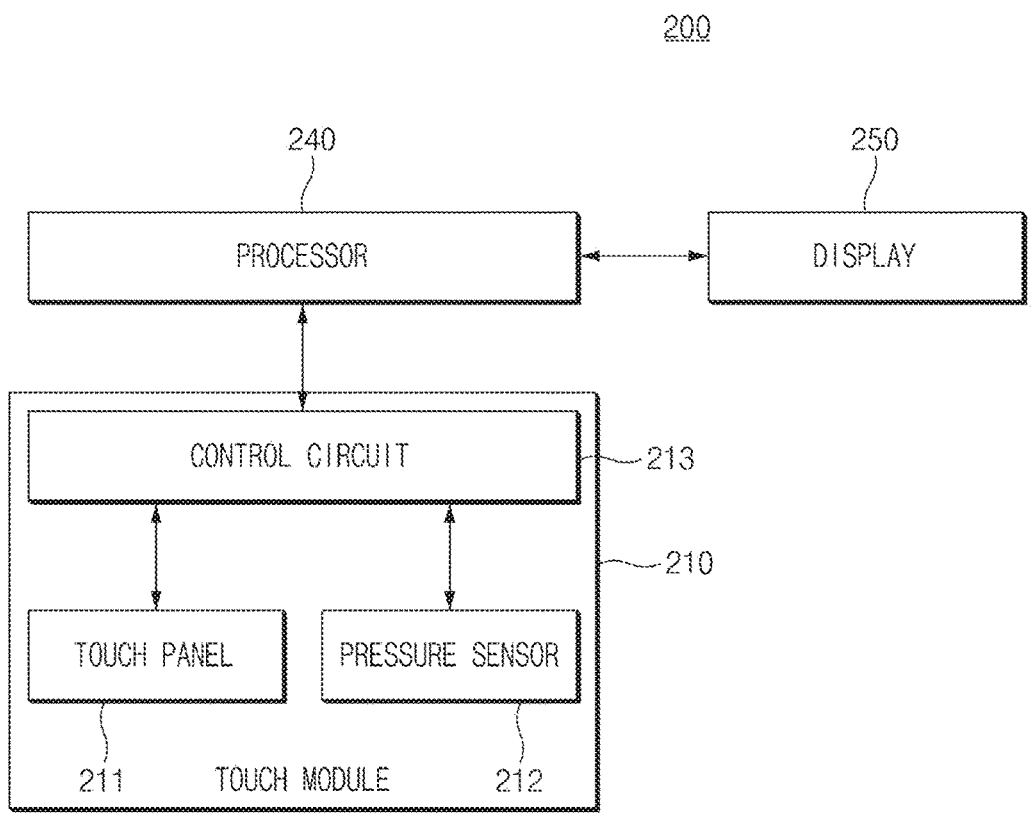
FIG. 2 is a block diagram illustrating a configuration of an electronic device, according to an embodiment of the present disclosure.

FIG. 2 is a block diagram illustrating a configuration of an electronic device, according to an embodiment of the present disclosure.

Referring to FIG. 2, an electronic device 200 includes, for example, a touch module 210, a processor 240, and a display 250.

For example, the touch module 210 may include a touch panel 211, a pressure sensor 212, and a control circuit 213.

The touch panel 211 (e.g., the first sensor) may be a capacitive touch panel and may sense, for example, a touch input. The touch panel 211 may sense the touch input through a variation of the amount of charge passing through an electrode of the touch panel 211. For example, in the case where a conductor, such as a user's finger, a stylus, or the like, makes contact with a cover glass of the electronic device 200, the touch panel 211 may sense a touch input. As another example, in the case where a conductive foreign substance, such as water or the like, makes contact with the cover glass of the electronic device 200, or in the case where a noise, such as an external electromagnetic wave or the like, passes through the touch panel 211, the touch panel 211 may sense a touch input.

The pressure sensor 212 (e.g., the second sensor) may sense a pressure applied by a touch input due to contact between the display 250 and the device used for the touch input. The pressure sensor 212 may sense a pressure based on a physical variation in resistance, inductance, capacitance, elastic force, molecular density, current, voltage, phase of light, intensity of light, or the like. There are various kinds of the pressure sensors, for example, a piezoresistive method, a capacitive method, a piezoelectric method, and the like; however, the pressure sensor 212 may not be limited to a pressure sensor of a specific method. For example, the pressure sensor 212 may sense a pressure based on a variation in capacitance of a capacitor included in the pressure sensor 212 (e.g., capacitive method). In particular, the pressure sensor 212 may sense a pressure based on a variation in capacitance according to a change of a distance between a positive electrode and a negative electrode of the capacitor.

In the case where a conductor, such as a user's finger, a stylus, or the like, makes contact with a cover glass of the electronic device 200, the pressure sensor 212 may sense a change of a pressure applied by the contact. Since the pressure is inevitably applied to the cover glass in the case where a touch input is applied by the user, the pressure sensor 212 may sense the pressure applied by the touch input.

In the case where a conductive foreign substance is attached on the cover glass of the electronic device 200, or in the case where a noise, such as an external electromagnetic wave or the like, passes through the touch panel 211, the pressure sensor 212 may not sense a change of a pressure. Alternatively, in the case where the conductive foreign substance is attached on the cover glass or in the case where the noise passes through the touch panel 211, the pressure sensor 212 may sense a change of a pressure that is smaller than the change of the pressure applied by a touch input of the user. In the case where a touch input by the conductive foreign substance, a noise, or the like is sensed, a pressure may not be applied to the cover glass. For this reason, the pressure sensor 212 may fail to sense the pressure applied by the touch input by the conductive foreign substance, a noise, or the like or may sense a very small pressure.

For example, the control circuit 213 may be electrically connected with the touch panel 211 and the pressure sensor 212, and the control circuit 213 may control the touch panel 211 and/or the pressure sensor 212. That is, the touch panel 211 sensing a touch input and/or the pressure sensor 212 sensing a pressure may be controlled by the control circuit 213, and thus, the touch panel 211 and/or the pressure sensor 212 may be implemented with one module (e.g., the touch module 210).

The control circuit 213 may obtain coordinates (e.g., location information) of a touch input and a pressure value (e.g., pressure information) corresponding to the touch input. In the case where the touch input is sensed in the touch panel 211, the control circuit 213 may obtain coordinates of the touch input from the touch panel 211. For example, the control circuit 213 may obtain the coordinates of the touch input based on a variation of an amount of charge of an electrode included in the touch panel 211. In the case where a pressure is sensed in the pressure sensor 212, the control circuit 213 may obtain the pressure value corresponding to the touch input from the pressure sensor 212. For example, the control circuit 213 may obtain a pressure value corresponding to a touch input based on a variation in capacitance of a capacitor included in the pressure sensor 212. As another example, the control circuit 213 may obtain a pressure value based on a variation in resistance of a resistor included in the pressure sensor 212. As another example, the control circuit 213 may obtain a pressure value based on a voltage variation in the pressure sensor 212.

In the case where coordinates (x, y) are obtained from the touch panel 211 and a pressure value "p" is obtained from the pressure sensor 212, the control circuit 213 may generate three-dimensional coordinates (x, y, p) of a touch input by using the coordinates (x, y) and the pressure value "p". The control circuit 213 may integrate the coordinates (x, y) and the pressure value "p" into data (the three-dimensional coordinates (x, y, p)) for management.

If a pressure value is greater than or equal to a threshold value, the control circuit 213 may provide coordinates to the processor 240. The control circuit 213 may compare the obtained pressure value with the threshold value. For example, in the case where the pressure value is greater than or equal to '0', that is, in the case where a pressure is sensed by a touch input due to the contact (e.g., a touch input by the user or a conductor), the control circuit 213 may provide the processor 240 with coordinates (e.g., two-dimensional coordinates (x, y) or three-dimensional coordinates (x, y, p)), which correspond to the pressure value. As another example, in the case where the pressure value is greater than or equal to a threshold value Pth, the control circuit 213 may provide the processor 240 with coordinates corresponding to the pressure value. The control circuit 213 may generate three-dimensional coordinates (x, y, p). If the pressure value "p" is greater than or equal to the threshold value after generation of the three-dimensional coordinates (x, y, p), the control circuit 213 may provide the three-dimensional coordinates (x, y, p) to the processor 240.

If a pressure value is less than the threshold value, the control circuit 213 may not provide coordinates to the processor 240. For example, if the pressure value is '0', that is, if a pressure is applied by a touch input due to a noise is not sensed, the control circuit 213 may not provide coordinates corresponding to the pressure value to the processor 240. As another example, in the case where the pressure value is less than the threshold value Pth, the control circuit 213 may not provide the coordinates corresponding to the pressure value to the processor 240. The control circuit 213 may generate three-dimensional coordinates (x, y, p). If the pressure value "p" is less than the threshold value, the control circuit 213 may not provide the three-dimensional coordinates (x, y, p) to the processor 240. If the pressure value is less than the threshold value, the control circuit 213 may remove or discard the coordinates corresponding to the pressure value.

The control circuit 213 may perform the above-mentioned operations by driving firmware stored in the touch module 210.

As descried above, since the control circuit 213 determines coordinates of a touch input of which a pressure value is greater than or equal to the threshold value and sends the coordinates to the processor 240, a time needed to remove a ghost touch may be shortened, which overcomes some of the shortcomings of conventional electronic devices that are susceptible to ghost touches.

In the case where the same coordinates are successively obtained during a specific time (or more than a specific time) through the touch panel 211), the control circuit 213 may not provide the corresponding coordinates to the processor 240. Since a fine (or precise) movement occurs while the user inputs a touch input, coordinates of the touch input may change. Therefore, if the same coordinates are successively obtained during a specific time (e.g., 1 second) or more, the control circuit 213 may determine the touch input of the same coordinates is a ghost touch. For example, if the same coordinates are successively obtained for 1 second or more, the control circuit 213 may not provide the same coordinates to the processor 240.

In the case where coordinates are repeatedly obtained at a time interval, which is shorter than a specific time period, through the touch panel 211, the control circuit 213 may not provide the corresponding coordinates to the processor 240. In the touch input of the user, a speed at which press and/or release is repeated may be limited due to a physical limit of the user. Therefore, in the case where the press and/or the release are repeated at a time interval shorter than a specific time period, the control circuit 213 may determine the touch input of the corresponding coordinates as a ghost touch. For example, if the press and/or the release are repeated at a time interval of 10 milliseconds or less, the control circuit 213 may not provide the corresponding coordinates to the processor 240.

The control circuit 213 may assign an identification value, which is maintained at the same value until a touch input is released, to the touch input. In the case where the electronic device 200 supports a multi-touch, the control circuit 213 may assign, for example, an identification value to the touch input to distinguish between a plurality of touch inputs. For example, the control circuit 213 may assign an identification value of '0' to a first touch input and may assign an identification value of '1' to a second touch input.

If a difference between a first time when coordinates of the touch input, to which the same identification value is assigned, are obtained, and a second time when the coordinates of the touch input, to which the same identification value is assigned, are obtained, is not more than a specific time, the control circuit 213 may provide the coordinates of the touch input to the processor 240. In particular, the control circuit 213 may obtain coordinates of a plurality of touch inputs, to which the identification value of '0' is assigned. The control circuit 213 may also obtain time information when the coordinates of the plurality of touch inputs are obtained. With regard to the touch input to which the identification value of '0' is assigned, the control circuit 213 may calculate a difference between a time when the coordinates are obtained for the first time and a second time when the coordinates are obtained (e.g., a time after the first time). If the difference is smaller than or equal to a specific time, the control circuit 213 may provide the coordinates of the touch input to the processor 240.

The control circuit 213 may provide the processor 240 with a pressure value associated with coordinates together with the coordinates of a touch input. The control circuit 213 may provide three-dimensional coordinates (x, y, p) to the processor 240. Alternatively, the control circuit 213 may provide two-dimensional coordinates (x, y) and the pressure value "p" associated with the two-dimensional coordinates (x, y) to the processor 240, respectively.

For example, the processor 240 may process a touch input received from the control circuit 213, and process the received touch input to perform a function corresponding to the touch input.

If a pressure value is less than a threshold value, the processor 240 may initialize or calibrate the touch panel 211. In the case where a ghost touch, of which the pressure value is less than the threshold value, is recognized, the processor 240 may perform various operations to remove the ghost touch from the touch panel 211. For example, in the case where a ghost touch is sensed through the touch panel 211, the processor 240 may remove the ghost touch sensed through the touch panel 211. For example, the processor 240 may allow the touch panel 211 to operate in a state where the initialization of the touch panel 211 is made by restarting the touch panel 211 at a time when power of the touch panel 211 is again supplied after being interrupted. As another example, if the ghost touch is recognized through the touch panel 211, the processor 240 may calibrate a signal that is supplied to the touch panel 211 to sense a touch input.

In the case where the same coordinates are successively obtained during a specific time through the touch panel 211, the processor 240 may initialize or calibrate the touch panel 211. In the case where the coordinates are repeatedly obtained at a time interval shorter than a specific time period through the touch panel 211, the processor 240 may initialize or calibrate the touch panel 211. If the same coordinates are successively obtained during the specific time or more or if the coordinates are repeatedly obtained at the time interval shorter than the specific time period, the processor 240 may receive a notification from the control circuit 213. The processor 240 may perform the above-mentioned initialization or calibration in response to the received notification.

If a pressure is sensed through the pressure sensor 212 while performing calibration, the processor 240 may output a warning screen through the display 250. If a touch input by the user is received while performing calibration, the calibration may not be performed correctly because the amount of charge can change due to the touch input. Therefore, the processor 240 may prevent, disregard, or block the touch input of the user by outputting the warning screen through the display 250. For example, the processor 240 may output the warning screen including an image, a text, or the like.

If a pressure is sensed through the pressure sensor 212 before the calibration, the processor 240 may output the warning screen through the display 250. If the touch input of the user is received after the performing of the calibration is determined according to recognition of a ghost touch and before the calibration is made, the processor 240 may output the warning screen.

As described above, the above initialization and calibration may be performed by the processor 240 and/or may be performed by the control circuit 213.

The processor 240 may determine whether the initialization and calibration of the touch panel 211 is needed and may command the control circuit 213 to perform a function, based on the determination result. The control circuit 213 may perform a function, such as the initialization, the calibration, and the like, in response to the command.

The control circuit 213 may determine whether the initialization and calibration is needed and may notify the processor 240 of information, such as the determination result. The processor 240 may verify the delivered information and may command the control circuit 213 to perform the initialization and/or calibration of the touch panel 211 based on the verification result. In this process, the processor 240 may receive a user intention about whether to perform a function of initializing and/or calibrating the touch panel 211 by displaying information (e.g., an icon) about performing the initialization and calibration on the display 250 or providing (e.g., display of an input window or the like) a user interface (e.g., a UX user experience). The control circuit 213 may perform the function of initializing and/or calibrating the touch panel 211, based on a command of the processor 240. For example, if the touch input of the user is received while performing calibration, the display 250 may output a warning screen including an image, a text, or the like. Furthermore, if the touch input of the user is received after the performing of the calibration is determined according to recognition of a ghost touch and before the calibration is made, the display 250 may output the warning screen.

In FIG. 2, the display 250 and the touch module 210 are illustrated as being independent of each other. However, embodiments are not limited thereto. For example, the display 250 and the touch module 210 may be implemented with an integrated module, e.g., a system on chip (SoC).

Figure 3:
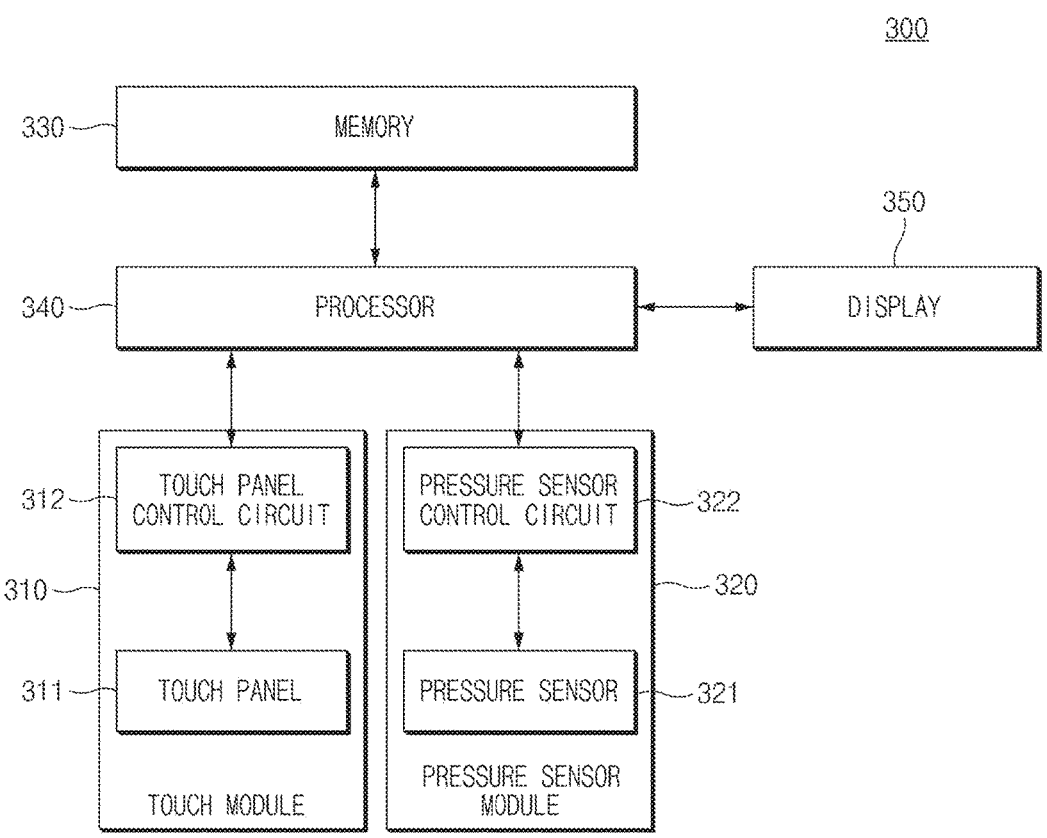
FIG. 3 is a block diagram illustrating a configuration of an electronic device, according to an embodiment of the present disclosure.

FIG. 3 is a block diagram illustrating a configuration of an electronic device, according to an embodiment of the present disclosure.

Referring to FIG. 3, an electronic device 300 includes a touch module 310, a pressure sensor module 320, a memory 330, a processor 340, and a display 350.

For example, the touch module 310 may include a touch panel 311 and a touch panel control circuit 312.

The touch panel 311 (a first sensor) may react (or detect), for example, to the contact of an external object to the display 350. For example, the touch panel 311 may react if the external object makes contact therewith. Furthermore, the touch panel 311 may react even if the external object is adjacent to the touch panel 311 within a specific distance without making contact with the touch panel 311 (e.g., a hovering input).

For example, the touch panel control circuit 312 may be electrically connected with the touch panel 311, and the touch panel control circuit 312 may control the touch panel 311. The touch panel control circuit 312 may obtain location information corresponding to an active area of the display 350 based on the reaction of the touch panel 311. The location information may include information about a location corresponding to a point (e.g., a pixel) on the display 350 or information about an area corresponding to a plurality of pixels of the display 350.

The pressure sensor module 320 may include, for example, a pressure sensor 321 and a pressure sensor control circuit 322.

The pressure sensor (a second sensor) 321 may react (detect) to a pressure applied to the display 350, for example. In the case where the pressure is applied by the contact of the external object, the pressure sensor 321 may react to the applied pressure.

For example, the pressure sensor control circuit 322 may be electrically connected with the pressure sensor 321. The pressure sensor control circuit 322 may control the pressure sensor 321. The pressure sensor control circuit 322 may obtain information of a pressure, which is applied to the display 350 by the contact of the external object, based on the reaction of the pressure sensor 321.

The pressure information obtained from the touch panel 311 may be distinguished from location information obtained from the pressure sensor 321. For example, the location information may include coordinates (x, y) on the display 350, and the pressure information may include a pressure value "p" applied to the display 350.

The memory 330 may include, for example, a volatile and/or nonvolatile memory. The memory 330 may store a driver for processing data received from the touch panel control circuit 312 and the pressure sensor control circuit 322.

For example, the processor 340 may be electrically connected with the touch panel 311 (or the touch panel control circuit 312), the pressure sensor 321 (or the pressure sensor control circuit 322), the memory 330, and the display 350.

The processor 340 may obtain location information corresponding to an active area of the display 350, at which the contact of an external object to the display 350 occurs. The processor 340 may obtain the location information through the touch panel 311 or the touch panel control circuit 312.

The processor 340 may obtain pressure information corresponding to a pressure applied to the display 350 by contact of the external object, via the pressure sensor 321 or the pressure sensor control circuit 322.

The processor 340 may synchronize location information with pressure information by changing an interrupt period of the pressure sensor 321 to be the same as an interrupt period of the touch panel 311. For example, the processor 340 may adjust a signal, which is supplied to the touch panel 311 to sense the contact, and a signal, which is supplied to the pressure sensor 321 to sense a pressure, such that the signals have the same or similar frequencies and the same or similar phases.

If the pressure information satisfies a specific condition, the processor 340 may determine that location information is valid, by using the pressure information. For example, if the pressure information is greater than '0', the processor 340 may determine that the location information associated with the corresponding pressure information is valid. As another example, if the pressure information is greater than or equal to the threshold value Pth, the processor 340 may determine that the location information associated with the corresponding pressure information is valid.

If the pressure information does not satisfy the specific condition, the processor 340 may determine that location information is invalid. For example, if the pressure information is '0', the processor 340 may determine that the location information associated with the corresponding pressure information is invalid. As another example, if the pressure information is less than the threshold value Pth, the processor 340 may determine that the location information associated with the corresponding pressure information is invalid.

The processor 340 may determine whether a state in which an external object is contacted with the first sensor is valid, based at least in part on location information and pressure information.

If the state in which the external object is contacted with the first sensor is invalid, the processor 340 may discard the location information. Alternatively, the touch panel 311 may be initialized or calibrated.

The display 350 may display, for example, various contents (e.g., a text, an image, a video, an icon, a symbol, and the like) to the user. The display 350 may be implemented with an integrated module including the touch panel 311 and the pressure sensor 321 and may receive, for example, a touch, gesture, contact, proximity, or hovering input by using an electronic pen or a part of a user's body.

The control circuit 213, the touch panel control circuit 312, or the pressure sensor control circuit 322 may be implemented by software, firmware, hardware, or a combination thereof. The control circuit 213, the touch panel control circuit 312, or the pressure sensor control circuit 322 may be implemented (e.g., executed), for example, with a processor (e.g., the processor 120). The control circuit 213, the touch panel control circuit 312, or the pressure sensor control circuit 322 may include, for example, modules, programs, routines, sets of instructions, processes, or the like for performing one or more functions.

Figure 4:
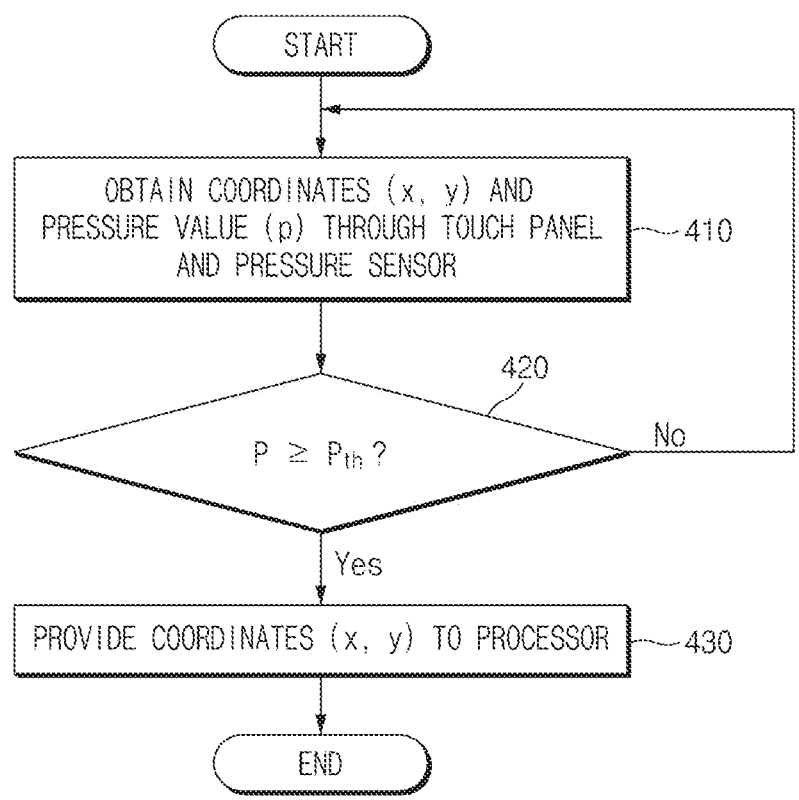
FIG. 4 is a flowchart illustrating a method of obtaining coordinates through a touch panel of an electronic device, according to an embodiment of the present disclosure.

FIG. 4 is a flowchart illustrating a method of obtaining coordinates through a touch panel of an electronic device, according to an embodiment of the present disclosure.

The method of FIG. 4 may implemented using the electronic device 200 (e.g., the control circuit 213), or the electronic devices of FIGS. 1 and 3.

Referring to FIG. 4, in operation 410, the electronic device 200 (e.g., the control circuit 213) may obtain coordinates (x, y) and a pressure value "p" of a touch input through the touch panel 211 and the pressure sensor 212, respectively. The electronic device 200 may sense the touch input. Furthermore, the electronic device 200 may sense a pressure applied by the touch input. For example, the electronic device 200 may recognize a point, at which the amount of charge is changed by the touch input, to obtain the coordinates (x, y) of the point, to which the touch input is applied. For example, the electronic device 200 may recognize a variation in capacitance of a capacitor for measuring the pressure due to the touch input to obtain the pressure value "p".

The electronic device 200 may generate three-dimensional coordinates (x, y, p) of the touch input by using the coordinates (x, y) and the pressure value "p".

If the pressure value "p" is obtained, in operation 420, the electronic device 200 may determine whether the pressure value "p" is greater than or equal to the threshold value Pth. The electronic device 200 may compare the pressure value "p" with the threshold value Pth. If the pressure value "p" is greater than or equal to the threshold value Pth, the electronic device 200 may determine that the coordinates (x, y) of the touch input are valid, to allow a function corresponding to the touch input to be performed. If the pressure value "p" is less than the threshold value Pth, the electronic device 200 may determine that the coordinates (x, y) of the touch input are invalid.

In operation 430, if the pressure value "p" is greater than or equal to the threshold value Pth, the electronic device 200 may provide the coordinates (x, y) corresponding to the pressure value "p" to the processor 240 of the electronic device 200. That is, the electronic device 200 may provide the coordinates (x, y) to the processor 240 in the case where it is determined that the coordinates (x, y) of the touch input are valid.

If it is determined that the coordinates (x, y) of the touch input are invalid, the electronic device 200 may discard the coordinates (x, y). The electronic device 200 may not provide the coordinates (x, y) to the processor 240. The electronic device 200 may remove the coordinates (x, y).

Figure 5:
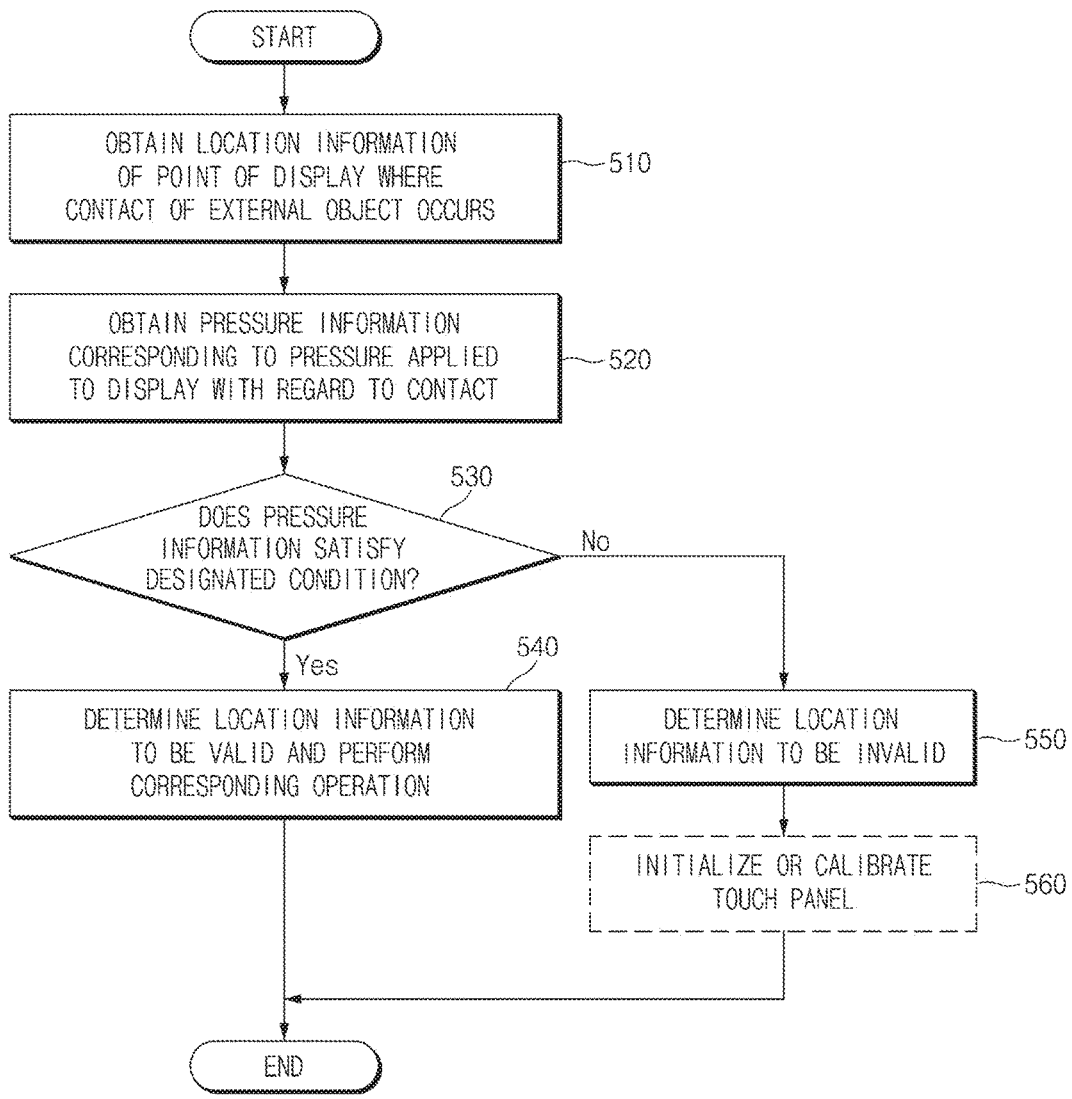
FIG. 5 is a flowchart illustrating a method of obtaining coordinates through a touch panel of an electronic device, according to an embodiment of the present disclosure.

FIG. 5 is a flowchart illustrating a method of obtaining coordinates through a touch panel of an electronic device, according to an embodiment of the present disclosure.

The method of FIG. 5 may be implemented using the electronic device 300 (e.g., the processor 340) of FIG. 3.

Referring to FIG. 5, in operation 510, in response to the contact of an external object to the display 350, the electronic device 300 may obtain location information corresponding to an active area of the display, at which the contact occurs, by using the first sensor (e.g., the touch panel 311). The electronic device 300 may obtain the location information by using the first sensor. The first sensor may react in the case where the external object comes close thereto. The electronic device 300 may obtain the location information of a point on the active area of the display, to which the external object is contacted, in response of the reaction of the first sensor. For example, the location information may include coordinates (x, y) on the active area of the display.

In operation 520, the electronic device 300 may obtain pressure information corresponding to a pressure applied to the display 350 with regard to the contact, by using the second sensor (e.g., the pressure sensor 321). The electronic device 300 may obtain the pressure information by using the second sensor. In the case where the external object makes contact with the display, the second sensor may react. In the case where the external object makes contact with the display, the electronic device 300 may obtain the pressure information based on the reaction of the second sensor.

The electronic device 300 may synchronize the location information (e.g., coordinates (x, y)) with the pressure information (e.g., the pressure value "p"). For example, the electronic device 300 may synchronize the location information with the pressure information by changing an event processing period of the first sensor to be the same as an event processing period of the second sensor.

Operations 510 and 520 are described herein as being sequentially performed; however, these operations can be performed at the same time or may be performed in a reverse sequence.

In operation 530, the electronic device 300 may determine whether the pressure information satisfies a specific condition. For example, the electronic device 300 may determine whether the pressure value "p" included in the pressure information is greater than or equal to the threshold value Pth. As another example, the electronic device 300 may determine whether a variation of the pressure value "p" included in the pressure information is greater than or equal to a specific range.

In operation 540, if the specific condition is satisfied, the electronic device 300 may determine that the location information is valid, by using the pressure information. The electronic device 300 may determine that the location information is valid, to allow a function corresponding to the touch input to be executed only in the case where the pressure information satisfies the specific condition. For example, if the pressure value "p" is not '0' (not zero), the electronic device 300 may determine that the location information is valid. If it is determined that the location information is valid, the electronic device 300 may perform a function corresponding to the location information.

In operation 550, if the specific condition is not satisfied, the electronic device 300 may determine that the location information is invalid. If the pressure information does not satisfy the specific condition, that is, if a ghost touch is recognized, the electronic device 300 may determine that the location information is invalid, such that the function corresponding to the touch input is not performed.

In operation 560, the electronic device 300 may initialize or calibrate the first sensor (or the touch panel). For example, if the coordinates (x, y) associated with the pressure value "p", which is less than the threshold value Pth, are successively obtained during a specific time (e.g., 10 seconds) or more, the electronic device 300 may initialize or calibrate the first sensor. As another example, if the coordinates (x, y) associated with the pressure value "p", which is less than the threshold value Pth, are repeatedly obtained at a time interval shorter than a specific time period (e.g., 10 milliseconds), the electronic device 300 may initialize or calibrate the first sensor. As another example, the electronic device 300 may count the number of the coordinates (x, y) associated with the pressure value "p", which is less than the threshold value Pth. If the cumulative number of coordinates (x, y) is greater than or equal to a specific value, the electronic device 300 may initialize or calibrate the first sensor.

Operation 560 can be omitted.

Figure 6:
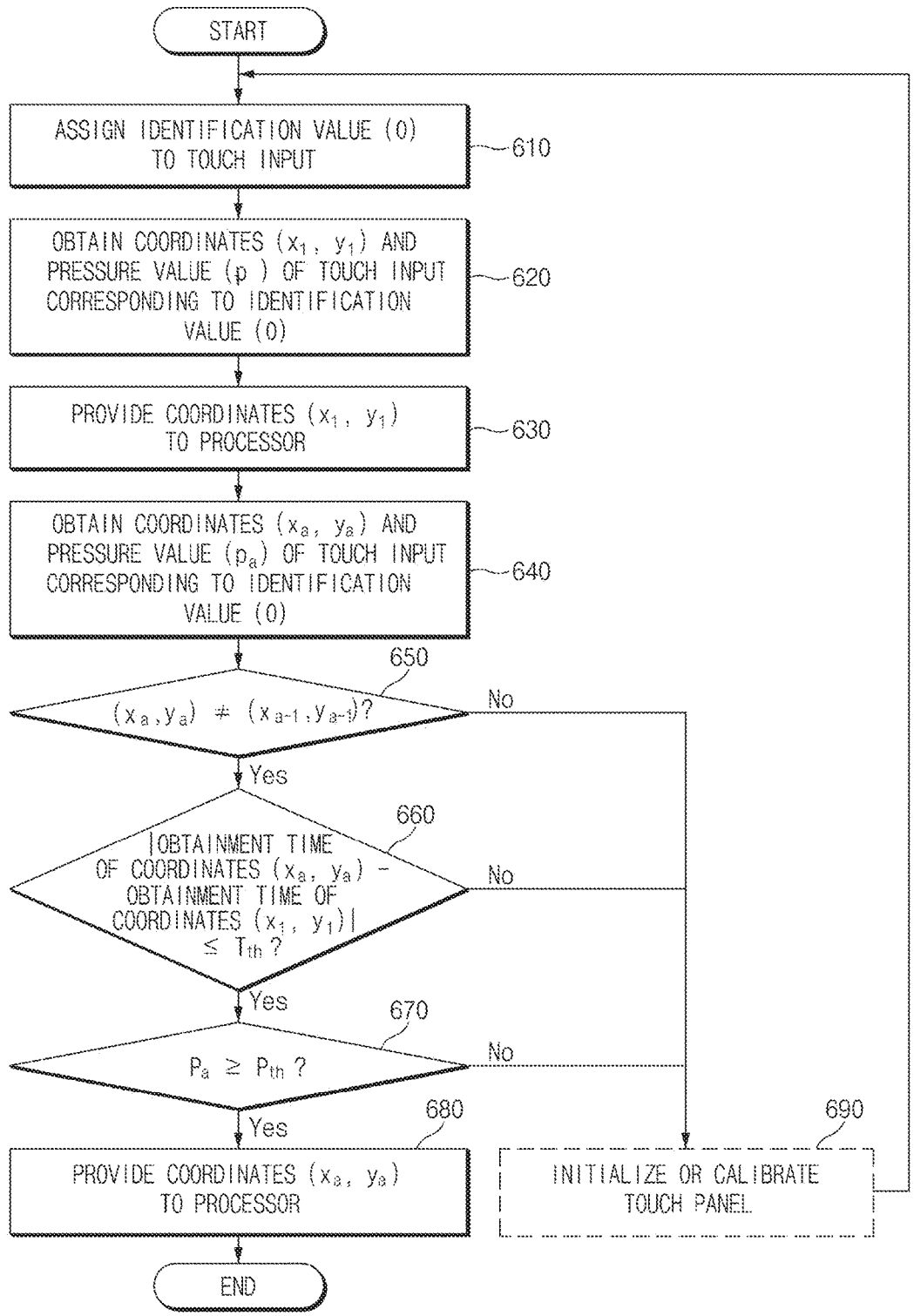
FIG. 6 is a flowchart illustrating a method of obtaining coordinates through a touch panel of an electronic device, according to an embodiment of the present disclosure.

FIG. 6 is a flowchart illustrating a method of obtaining coordinates through a touch panel of an electronic device, according to an embodiment of the present disclosure.

The method of FIG. 6 may be implanted using the electronic device 200 of FIG. 2.

Referring to FIG. 6, in operation 610, the electronic device 200 (e.g., the control circuit 213) may assign an identification value of '0' to a touch input of the touch panel 211. In the case where the electronic device 200 supports a multi-touch, the electronic device 200 may assign the identification value, for example, '0', '1', or '2', to each of a plurality of touch inputs to distinguish the plurality of touch inputs. The electronic device 200 may assign the same identification value to the touch inputs, which are sensed from a press time to a release time.

In operation 620, the electronic device 200 may obtain coordinates $(x_1, y_1)$ and a pressure value $p_1$ of a touch input corresponding to the identification value of '0'. The electronic device 200 may obtain the coordinates $(x_1, y_1)$ and the pressure value $p_1$ at a point in time when the touch input corresponding to the identification value of '0' is sensed for the first time.

In operation 630, the electronic device 200 may provide the coordinates $(x_1, y_1)$ to the processor 240. With regard to the coordinates $(x_1, y_1)$ of which the touch input corresponding to the identification value of '0' is sensed for the first time, the electronic device 200 may provide the coordinates $(x_1, y_1)$ to the processor 240 without performing operations 650 to 670.

In operation 640, the electronic device 200 may obtain coordinates ($x_a$, $y_a$) and a pressure value $p_a$ of the touch input corresponding to the identification value of '0'. The electronic device 200 may sequentially obtain coordinates ($x_2$, $y_2$), coordinates ($x_3$, $y_3$), and coordinates ($x_4$, $y_4$) of the touch input corresponding to the identification value of '0'. Furthermore, the electronic device 200 may sequentially obtain a pressure value $p_2$, a pressure value $p_3$, and a pressure value $p_4$ associated with the coordinates ($x_2$, $y_2$), the coordinates ($x_3$, $y_3$), and the coordinates ($x_4$, $y_4$), respectively.

In operation 650, the electronic device 200 may determine whether the coordinates ($x_a$, $y_a$) are the same as coordinates ($x_{a-1}$, $y_{a-1}$). For example, the electronic device 200 may determine whether coordinates ($x_5$, $y_5$) of the touch input corresponding to the identification value of '0' are the same as the coordinates ($x_4$, $y_4$) of the touch input corresponding to the identification value of '0', which are obtained immediately before the coordinates ($x_5$, $y_5$) are obtained. Because of a movement of the user's body, a touch input of the user may not continuously input the same coordinates. Therefore, if the coordinates ($x_a$, $y_a$) and the coordinates ($x_{a-1}$, $y_{a-1}$) are the same as each other, the electronic device 200 may determine that the coordinates ($x_a$, $y_a$) are invalid. If the coordinates ($x_a$, $y_a$) are different from the coordinates ($x_{a-1}$, $y_{a-1}$), the electronic device 200 may determine that the coordinates ($x_a$, $y_a$) are valid.

In operation 660, if the coordinates ($x_a$, $y_a$) and the coordinates ($x_{a-1}$, $y_{a-1}$) are the same as each other, the electronic device 200 may determine whether a difference between a time when the coordinates ($x_a$, ya) are obtained and a time when the coordinates ($x_1$, $y_1$) are obtained is smaller than or equal to a threshold value Tth. The electronic device 200 may determine a duration of the touch input corresponding to the identification value of '0' by calculating the difference between the time when the coordinates ($x_a$, $y_a$) are obtained and the time when the coordinates ($x_1$, $y_1$) are obtained. For example, if the difference between the two time informations is 1 second or less, the electronic device 200 may determine that the coordinates ($x_a$, $y_a$) are valid. As described above, since the touch input of the user does not continuously input the same coordinates, if the duration of the touch input corresponding to the identification value of '0' is greater than or equal to the threshold value Tth, the electronic device 200 may determine that the coordinates ($x_a$, $y_a$) are invalid.

If the difference between the time when the coordinates ($x_a$, $y_a$) are obtained and the time when the coordinates ($x_1$, $y_1$) are obtained is smaller than or equal to the threshold value Tth, in operation 670, the electronic device 200 may determine whether the pressure value $p_a$ is greater than or equal to the threshold value Pth.

Operations 650, 660, and 670 are described herein as being sequentially performed; however, these operations can be performed in various sequences.

If the pressure value $p_a$ is greater than or equal to the threshold value Pth, in operation 680, the electronic device 200 may provide the coordinates ($x_a$, $y_a$) to the processor 240.

If the coordinates ($x_a$, $y_a$) are the same as the coordinates ($x_{a-1}$, $y_{a-1}$), if the difference between the time when the coordinates ($x_a$, $y_a$) are obtained and the time when the coordinates ($x_1$, $y_1$) are obtained exceeds the threshold value Tth, or if the pressure value $p_a$ is less than the threshold value Pth, in operation 690, the electronic device 200 (e.g., the control circuit 213 or the processor 240) may initialize or calibrate the touch panel 211. In the case where a ghost touch is continuously sensed, the electronic device 300 may initialize or calibrate the touch panel 311 to remove the ghost touch sensed in the touch panel 311. For example, the electronic device 300 may initialize the touch panel 311 by supplying power to the touch panel 311 again after interrupting the power supplied to the touch panel 311. As another example, the electronic device 300 may calibrate a signal that is being supplied to the touch panel 311 to sense the touch input.

Operation 690 can be omitted.

Figure 7:
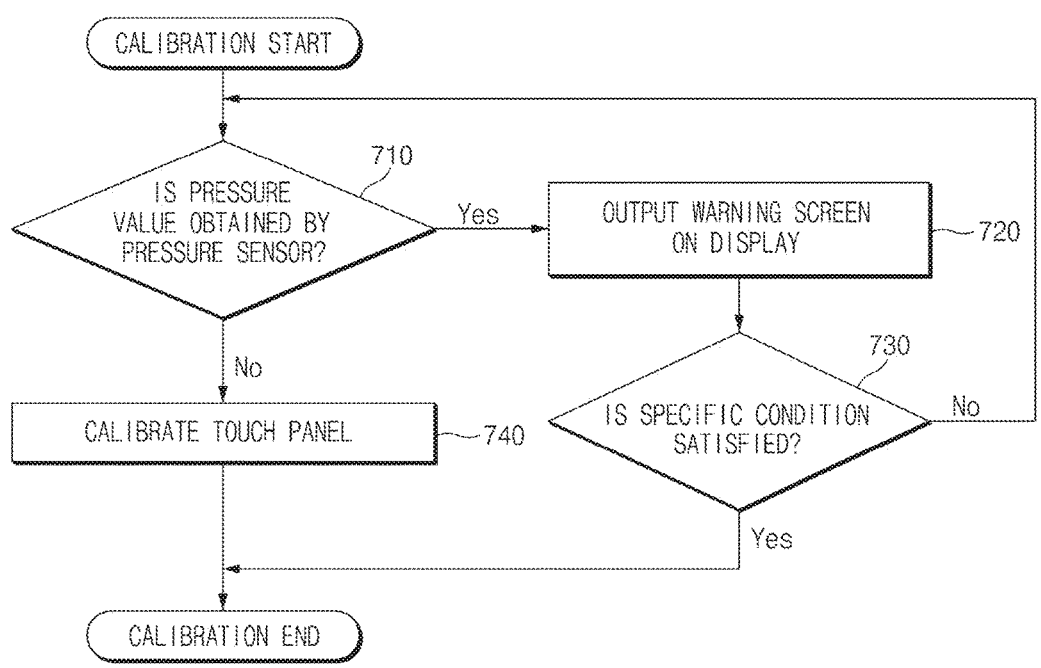
FIG. 7 is a flowchart illustrating a method of obtaining coordinates through a touch panel of an electronic device, according to an embodiment of the present disclosure.
Figure 8:
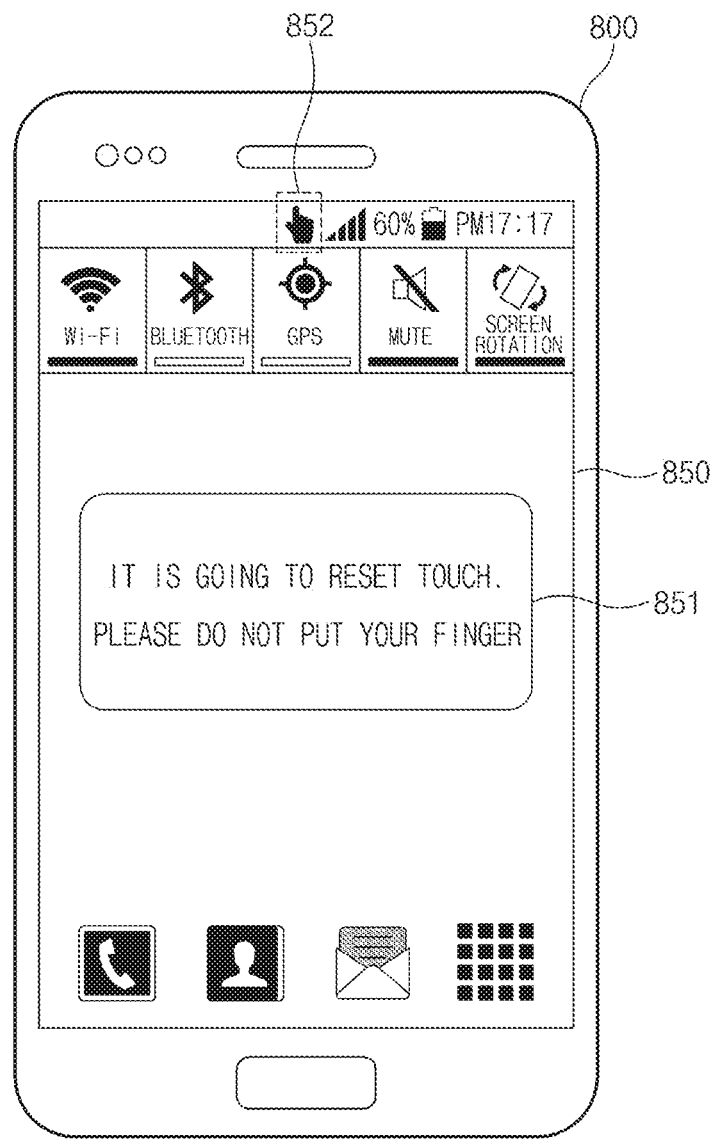
FIG. 8 is a screen shot illustrating an input identifying method of a device, which is outside an electronic device, according to an embodiment of the present disclosure.

FIG. 7 is a flowchart illustrating a method of obtaining coordinates through a touch panel of an electronic device, according to an embodiment of the present disclosure. FIG. 8 is a screen shot illustrating an input identifying method of a device, which is outside an electronic device according to an embodiment of the present disclosure.

The flowchart illustrated in FIG. 7 may be implemented using the electronic device 200 of FIG. 2.

Referring to FIG. 7, in operation 710, the electronic device 200 may determine whether a pressure value is obtained through the pressure sensor 212 after determining to start the calibration of the touch panel 211 or after the calibration starts. If the amount of charge in the touch panel 211 changes according to a touch input of the user after the calibration starts, the calibration may be performed incorrectly. Therefore, to determine whether the touch input of the user is sensed after determining to start the calibration or after the calibration starts, the electronic device 200 may determine whether the pressure value is obtained.

Operation 710 is described herein as being performed before operation 740; however, operation 710 may be performed at any time between a time when the calibration starts and a time when the calibration is completed.

If the pressure value is obtained, in operation 720, the electronic device 200 may output a warning screen through the display 230.

Referring to FIG. 8, a display 850 (e.g., the display 250 or 350) of an electronic device 800 may output a warning screen including a warning message 851 and/or a warning icon 852. If the electronic device 800 initiates the calibration, the electronic device 800 may output the warning icon 852 that is used to notify the user that the calibration of the touch panel starts. Furthermore, if the touch input of the user is sensed after the calibration of the touch panel starts, the electronic device 800 may output the warning message 851 to prevent an additional touch input of the user.

The electronic device 800 may display at least a portion of the warning message 851 or the warning icon 852 with at least one of a text, an image, an icon, a floating icon, and a tile, or may represent at least a portion of the warning message 851 or the warning icon 852 with a sound or a vibration through the audio module (e.g., an audio module 1080 of FIG. 10) or a motor (e.g., a motor 1098 of FIG. 10) that may be included in the electronic device 800. Furthermore, the electronic device 800 may provide the warning message 851 or the warning icon 852 after differently setting the following item associated with the warning message 851 or the warning icon 852: 1) an output method from the electronic device to the outside (e.g., a display-based output method, an audio module-based output method, a motor-based method, or the like); 2) a color; 3) luminosity; 4) transparency; 5) a display location; 6) a size; 7) content displayed on the at least part; or 8) a visual effect of the content.

In operation 730, the electronic device 200 may determine whether a specific condition is satisfied. For example, the electronic device 200 may determine whether the number of times that the pressure value is obtained after initiation of the calibration is greater than or equal to a specific value "n". For example, the specific condition may be determined according to a policy previously set in the electronic device 200 or may be changed by a user setting. Since it may be difficult to repeat the calibration due to the touch input of the user without limit, the electronic device 200 may grasp (capture) the number of times that the touch input of the user is sensed after initiation of the calibration. If the number of times that the pressure value is obtained is less than the specific value "n", the electronic device 200 may perform the calibration from the beginning again. If the number of times that the pressure value is obtained is greater than or equal to the specific value "n", the electronic device 200 may end the calibration without additional calibration.

If the pressure value is not obtained through the pressure sensor 212, in operation 740, the electronic device 200 may calibrate the touch panel 211.

The operations 410 to 430, operations 510 to 550, operations 610 to 690, or operations 710 to 740 described herein may be executed by a successive method, a parallel method, a repeated method, or a heuristic method. For example, the operations may be executed in different sequences, some operations may be omitted, or other operations may be added.

Figure 9:
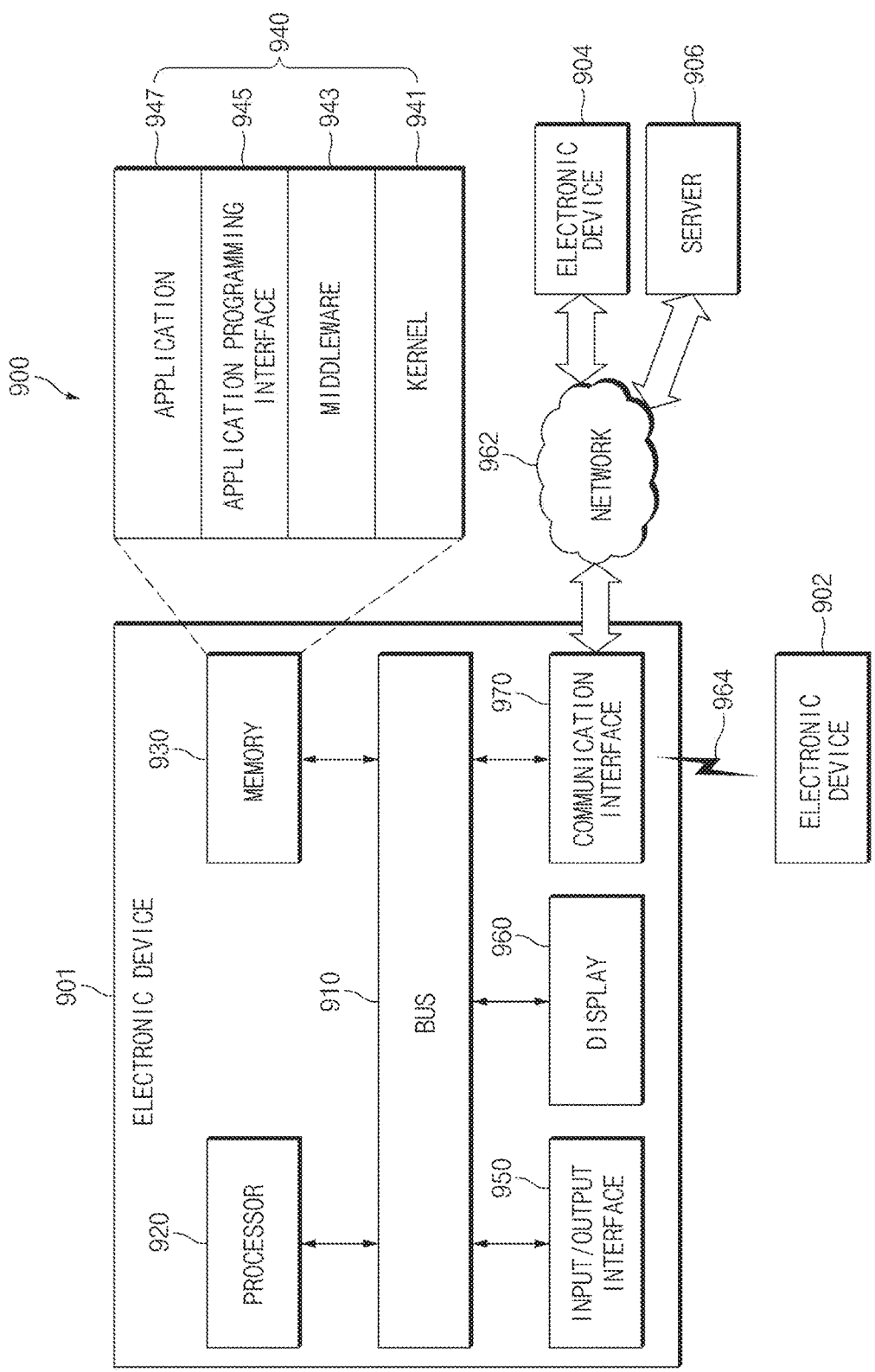
FIG. 9 is a diagram illustrating an electronic device in a network environment, according to an embodiment of the present disclosure.

FIG. 9 is a diagram illustrating an electronic device in a network environment, according to an embodiment of the present disclosure.

Referring to FIG. 9, an electronic device 901, 902, or 904 or a server 906 may be connected with each other over a network 962 or a local area network 964. The electronic device 901 includes a bus 910, a processor 920, a memory 930, an input/output interface 950, a display 960, and a communication interface 970. The electronic device 901 may not include at least one of the above-described elements or may further include other element(s).

For example, the bus 910 may interconnect the above-described elements 910 to 970 and may be a circuit for conveying communications (e.g., a control message and/or data) among the above-described elements.

The processor 920 may include one or more of a central processing units (CPUs), an application processor (AP), or a communication processor (CP). For example, the processor 920 may perform an arithmetic operation or data processing associated with control and/or communication of at least other elements of the electronic device 901.

The memory 930 may include a volatile and/or nonvolatile memory. The memory 930 may store instructions or data associated with at least one other element(s) of the electronic device 901. The memory 930 may store software and/or a program 940. The program 940 may include, for example, a kernel 941, a middleware 943, an application programming interface (API) 945, and/or an application program (or "an application") 947. At least a part of the kernel 941, the middleware 943, or the API 945 may be called an operating system (OS).

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete elements of the electronic device 901 so as to control or manage system resources.

The middleware 943 may perform a mediation role such that the API 945 or the application program 947 communicates with the kernel 941 to exchange data.

Furthermore, the middleware 943 may process task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be, for example, an interface through which the application program 947 controls a function provided by the kernel 941 or the middleware 943, and may include, for example, at least one interface or function (e.g., an instruction) for a file control, a window control, image processing, a character control, or the like.

The input/output interface 950 may play a role, for example, an interface which transmits an instruction or data input from a user or another external device, to other element(s) of the electronic device 901. Furthermore, the input/output interface 950 may output an instruction or data, received from other element(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, contact, proximity, or hovering input using an electronic pen or a part of a user's body.

For example, the communication interface 970 may establish communication between the electronic device 901 and the first external electronic device 902, the second external electronic device 904, or the server 906. For example, the communication interface 970 may be connected to the network 962 over wireless communication or wired communication to communicate with the second external electronic device 904 or the server 906.

The wireless communication may include at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local area network 964. The local area network 964 may include at least one of a wireless fidelity (Wi-Fi), a Bluetooth (BT), a near field communication (NFC), a magnetic stripe transmission (MST), a global navigation satellite system (GNSS), or the like.

The MST may generate a pulse in response to transmission data using an electromagnetic signal, and the pulse may generate a magnetic field signal. The electronic device 901 may transfer the magnetic field signal to a POS device, and the POS device may detect the magnetic field signal using a MST reader. The POS device may recover the data by converting the detected magnetic field signal to an electrical signal.

The GNSS may include at least one of, for example, a global positioning system (GPS), a global navigation satellite system (Glonass), a beidou navigation satellite system (Beidou), or a European global satellite-based navigation system (Galileo) based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard 232 (RS-232), a plain old telephone service (POTS), or the like. The network 962 may include at least one of telecommunications networks, for example, a computer network (e.g., LAN or WAN), an Internet, or a telephone network.

Each of the first and second external electronic devices 902 and 904 may be a device of which the type is different from or the same as that of the electronic device 901. The server 906 may include a group of one or more servers. All or a part of operations that the electronic device 901 can perform may be executed by the electronic devices 902 and 904 or the server 906. In the case where the electronic device 901 executes any function or service automatically or in response to a request, the electronic device 901 may not perform the function or the service internally, but, alternatively additionally, it may request at least a part of a function associated with the electronic device 901 at the electronic device 902 or 904 or the server 906. The electronic device 902 or 904 or the server 906 may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
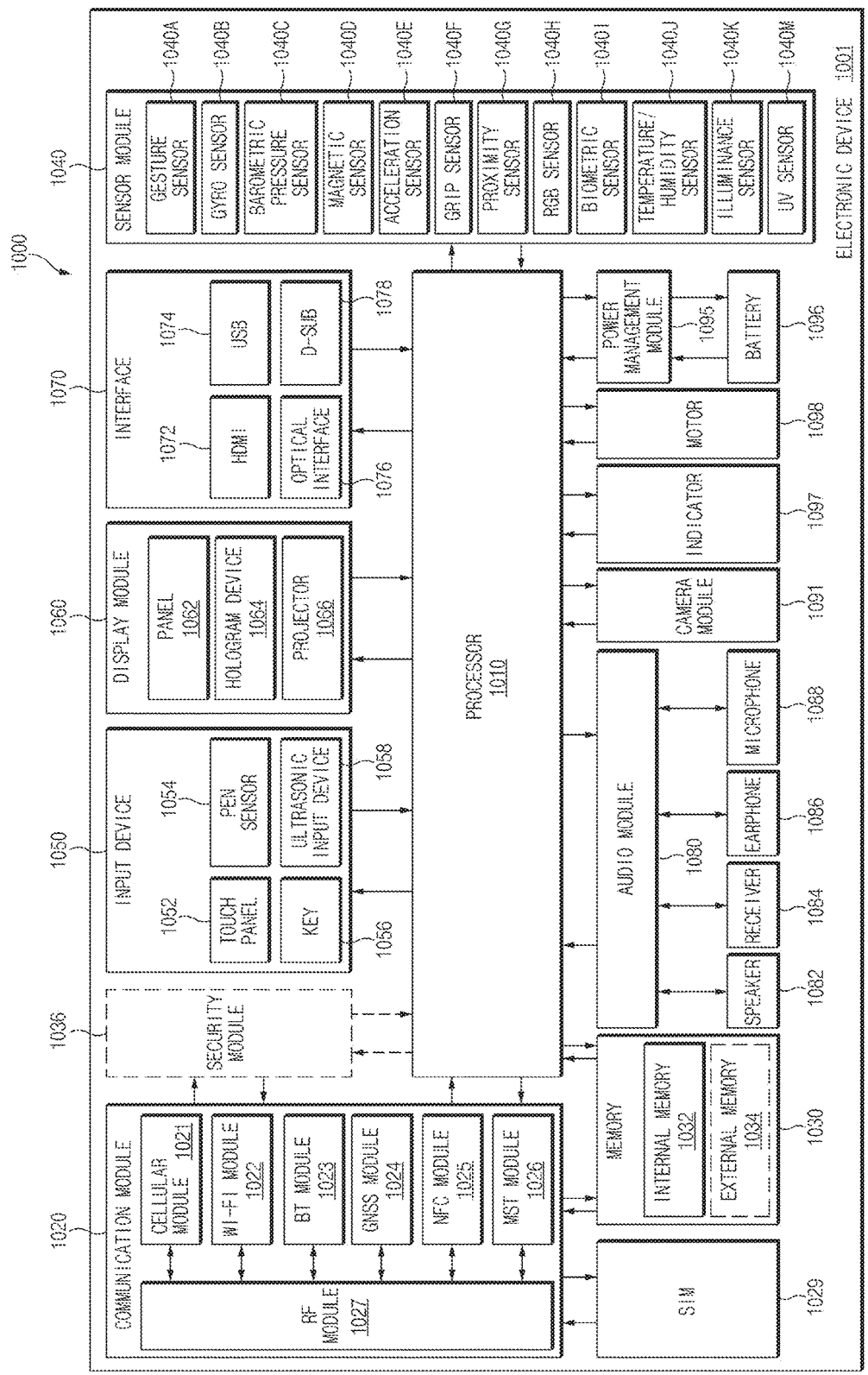
FIG. 10 is a block diagram illustrating an electronic device, according to an embodiment of the present disclosure.

FIG. 10 is a block diagram illustrating an electronic device, according to an embodiment of the present disclosure.

Referring to FIG. 10, an electronic device 1001 may include, for example, all or a part of the electronic device 901 of FIG. 9. The electronic device 1001 may include one processor (e.g., an application processor) 1010, a communication module 1020, a subscriber identification module (SIM) 1029, a memory 1030, a sensor module 1040, an input device 1050, a display 1060, an interface 1070, the audio module 1080, a camera module 1091, a power management module 1095, a battery 1096, an indicator 1097, and the motor 1098.

The processor 1010 may drive, for example, an OS or an application to control a plurality of hardware or software elements connected to the processor 1010 and may process and compute a variety of data. For example, the processor 1010 may be implemented with an SoC. The processor 1010 may further include a graphic processing unit (GPU) and/or an image signal processor. The processor 1010 may include at least a part (e.g., a cellular module 1021) of elements illustrated in FIG. 10. The processor 1010 may load and process an instruction or data, which is received from at least one of other elements (e.g., a nonvolatile memory) and may store a variety of data in a nonvolatile memory.

The communication module 1020 may be configured the same as or similar to the communication interface 970 of FIG. 9. The communication module 1020 may include the cellular module 1021, a Wi-Fi module 1022, a BT module 1023, a GNSS module 1024 (e.g., a GPS module, a Glonass module, a Beidou module, or a Galileo module), an NFC module 1025, a MST module 1026, and a radio frequency (RF) module 1027.

The cellular module 1021 may provide, for example, voice communication, video communication, a character service, an Internet service, or the like over a communication network. The cellular module 1021 may perform discrimination and authentication of the electronic device 1001 within a communication network by using the SIM (e.g., a SIM card) 1029. The cellular module 1021 may perform at least a portion of functions that the processor 1010 provides. The cellular module 1021 may include a communication processor (CP).

Each of the Wi-Fi module 1022, the BT module 1023, the GNSS module 1024, the NFC module 1025, or the MST module 1026 may include a processor for processing data exchanged through a corresponding module, for example. At least a part (e.g., two or more) of the cellular module 1021, the Wi-Fi module 1022, the BT module 1023, the GNSS module 1024, the NFC module 1025, or the MST module 1026 may be included within one integrated circuit (IC) or an IC package.

For example, the RF module 1027 may transmit and receive a communication signal (e.g., an RF signal). For example, the RF module 1027 may include a transceiver, a power amplifier module (PAM), a frequency filter, a low noise amplifier (LNA), an antenna, or the like. At least one of the cellular module 1021, the Wi-Fi module 1022, the BT module 1023, the GNSS module 1024, the NFC module 1025, or the MST module 1026 may transmit and receive an RF signal through a separate RF module.

The SIM 1029 may be an embedded SIM that includes a unique identify information (e.g., integrated circuit card identifier (ICCID)) or subscriber information (e.g., integrated mobile subscriber identity (IMSI)).

The memory 1030 may include an internal memory 1032 or an external memory 1034. For example, the internal memory 1032 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory)), a hard drive, or a solid state drive (SSD).

The external memory 1034 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1034 may be operatively and/or physically connected to the electronic device 1001 through various interfaces.

A security module 1036 may be a module that includes a storage space of which a security level is higher than that of the memory 1030 and may be a circuit that guarantees safe data storage and a protected execution environment. The security module 1036 may be implemented with a separate circuit and may include a separate processor. For example, the security module 1036 may be in a smart chip or a secure digital (SD) card, which is removable, or may include an embedded secure element (eSE) embedded in a fixed chip of the electronic device 1001. Furthermore, the security module 1036 may operate based on an OS that is different from the OS of the electronic device 1001. For example, the security module 1036 may operate based on Java card open platform (JCOP) OS.

The sensor module 1040 may measure, for example, a physical quantity or may detect an operation state of the electronic device 1001. The sensor module 1040 may convert the measured or detected information to an electric signal. Generally or additionally, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H (e.g., red, green, blue (RGB) sensor), a biometric sensor 1040I, a temperature/humidity sensor 1040J, the illuminance sensor 1040K, or an ultra violet (UV) sensor 1040M. Although not illustrated, additionally or generally, the sensor module 1040 may further include, for example, an e-nose sensor, an electromyography sensor (EMG) sensor, an electroencephalogram (EEG) sensor, an electrocardiogram (ECG) sensor, an infrared (IR) sensor, an iris sensor, a fingerprint sensor, and the like. The sensor module 1040 may further include a control circuit for controlling at least one or more sensors included therein. The electronic device 1001 may further include a processor that is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input unit 1058. For example, as noted above, the touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user. The input device 1050 may further include a pressure sensor (e.g., the pressure sensor 212 of FIG. 2 or the pressure sensor 321 of FIG. 3), may further include a control circuit (e.g., the control circuit 213) that controls the touch panel 1052 and the pressure sensor, and may include a control circuit (e.g., the touch panel control circuit 312) that controls the touch panel 1052 and a control circuit (e.g., the pressure sensor control circuit 322) that controls the pressure sensor.

The (digital) pen sensor 1054 may be, for example, a part of a touch panel or may include an additional sheet for recognition. The key 1056 may include, for example, a physical button, an optical key, a keypad, or the like. The ultrasonic input device 1058 may detect (or sense) an ultrasonic signal, which is generated from an input device, through a microphone 1088 and may check data corresponding to the detected ultrasonic signal.

The display 1060 may include a panel 1062, a hologram device 1064, or a projector 1066. The panel 1062 may be configured to be the same as or similar to the display 960 illustrated in FIG. 9. The panel 1062 may be implemented, for example, to be flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be arranged in the inside or the outside of the electronic device 1001. The display 1060 may further include a control circuit for controlling the panel 1062, the hologram device 1064, or the projector 1066.

The interface 1070 may include, for example, an HDMI 1072, a (USB 1074, an optical interface 1076, or a D-sub-miniature (D-sub) 1078. The interface 1070 may be included, for example, in the communication interface 970 illustrated in FIG. 9. Additionally or generally, the interface 1070 may include, for example, a mobile high definition link (MHL) interface, a SD card/multi-media card (MMC) interface, or an infrared data association (IrDA) standard interface.

The audio module 1080 may convert a sound and an electric signal in dual directions. At least a part of the audio module 1080 may be included, for example, in the input/output interface 950 illustrated in FIG. 9. The audio module 1080 may process, for example, sound information that is input or output through a speaker 1082, a receiver 1084, an earphone 1086, or the microphone 1088.

The camera module 1091 is configured for shooting a still image or a video may include, for example, at least one or more image sensors (e.g., a front sensor or a rear sensor), a lens, an image signal processor (ISP), or a flash (e.g., an LED or a xenon lamp).

The power management module 1095 may manage, for example, power of the electronic device 1001. A power management integrated circuit (PMIC), a charger IC, or a battery gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate the following effects: vibration, haptic, and the like. Although not illustrated, a processing device (e.g., a GPU) for supporting a mobile TV may be included in the electronic device 1001. The processing device for supporting the mobile TV may process media data according to the standards of digital multimedia broadcasting (DMB), digital video broadcasting (DVB), MediaFlo™, or the like.

Each of the above-mentioned elements of the electronic device 1001 may be configured with one or more components, and the names of the elements may be changed according to the type of the electronic device. The electronic device may include at least one of the above-mentioned elements, and some elements may be omitted or other additional elements may be added. Furthermore, some of the elements of the electronic device 1001 may be combined with each other so as to form one entity, so that the functions of the elements may be performed in the same manner as before the combination.

Figure 11:
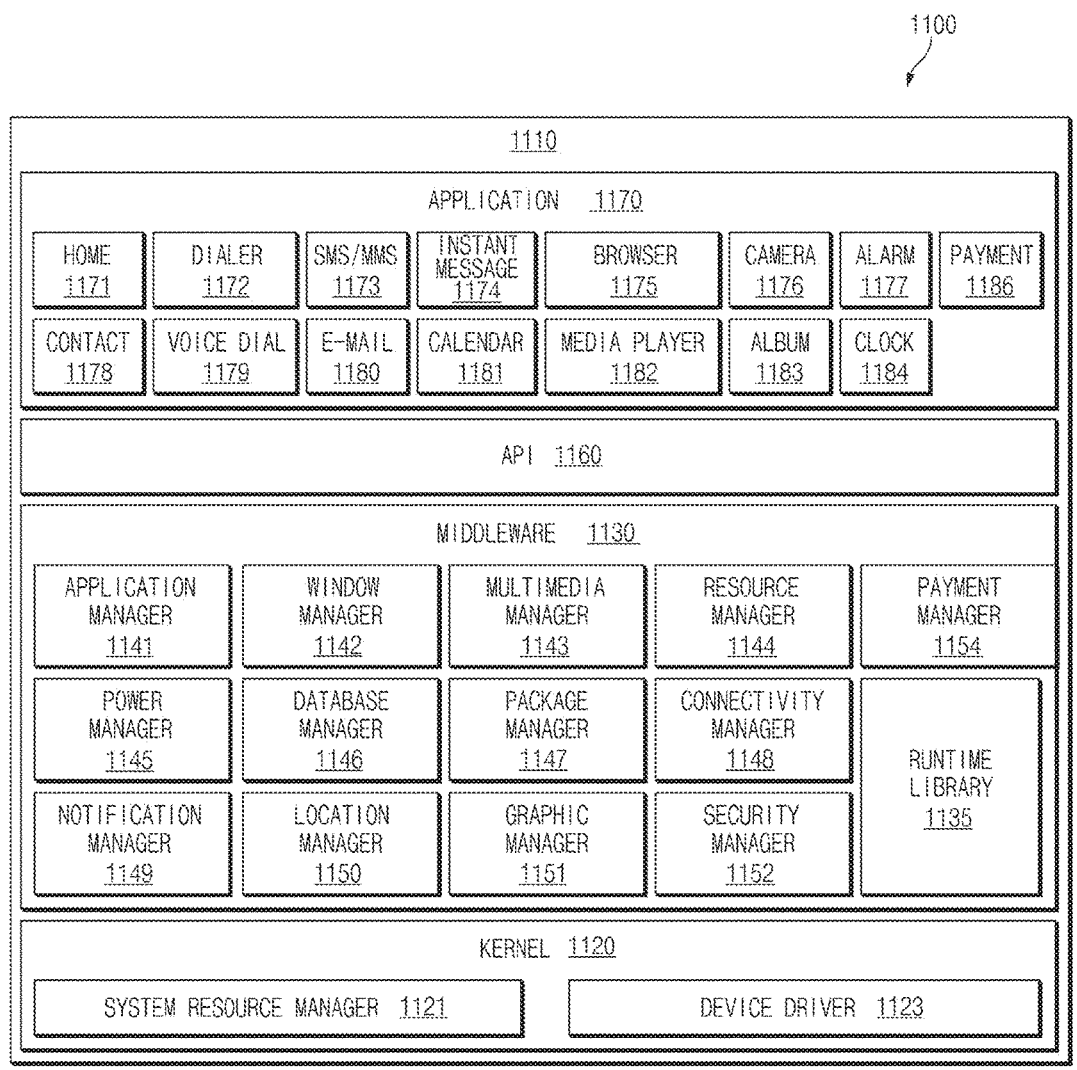
FIG. 11 is a block diagram of a program module, according to an embodiment of the present disclosure.

FIG. 11 illustrates a block diagram of a program module, according to an embodiment of the present disclosure.

A program module 1110 may include an OS to control resources associated with an electronic device (e.g., the electronic device 901), and/or diverse applications (e.g., application program 947) driven on the OS. The OS may be, for example, Android™, iOS™, Windows™, Symbian™, Tizen™, or Samsung Bada OS™.

The program module 1110 includes a kernel 1120, a middleware 1130, an API 1160, and/or an application 1170. At least a part of the program module 1110 may be preloaded on an electronic device or may be downloadable from the electronic device 902 or 904, the server 906, and the like.

The kernel 1120 may include, for example, a system resource manager 1121 or a device driver 1123. The system resource manager 1121 may perform control, allocation, or retrieval of system resources. The system resource manager 1121 may include a process managing unit, a memory managing unit, or a file system managing unit. The device driver 1123 may include, for example, a display driver, a camera driver, a Bluetooth driver, a shared memory driver, a USB driver, a keypad driver, a Wi-Fi driver, an audio driver, or an inter-process communication (IPC) driver.

The middleware 1130 may provide, for example, a function that the application 1170 needs in common, or may provide diverse functions to the application 1170 through the API 1160 to allow the application 1170 to efficiently use limited system resources of the electronic device. The middleware 1130 may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, a security manager 1152, or a payment manager 1154.

The runtime library 1135 may include, for example, a library module that is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a GUI resource that is used in a screen. The multimedia manager 1143 may identify a format necessary for playing diverse media files, and may perform encoding or decoding of media files by using a codec suitable for the format. The resource manager 1144 may manage resources such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify database that is to be used in at least one application of the application 1170. The package manager 1147 may install or update an application that is distributed in the form of package file.

The connectivity manager 1148 may manage, for example, wireless connection such as Wi-Fi or BT. The notification manager 1149 may display or notify an event such as arrival message, appointment, or proximity notification in a mode that does not disturb a user. The location manager 1150 may manage location information about an electronic device. The graphic manager 1151 may manage a graphic effect that is provided to a user, or manage a user interface relevant thereto. The security manager 1152 may provide a general security function necessary for system security or user authentication. In the case where the electronic device 901 includes a telephony function, the middleware 1130 may further includes a telephony manager for managing a voice or video call function of the electronic device.

The middleware 1130 may include a middleware module that combines diverse functions of the above-described elements. The middleware 1130 may provide a module specialized to each kind of OS to provide differentiated functions. Additionally, the middleware 1130 may dynamically remove a part of the preexisting elements or may add new elements thereto.

The API 1160 may be, for example, a set of programming functions and may be provided with a configuration that is variable depending on an OS. For example, in the case where an OS is the Android™ or the iOS™, it may be permissible to provide one API set per platform. In the case where an OS is the Tizen™, it may be permissible to provide two or more API sets per platform.

The application 1170 may include, for example, one or more applications capable of providing functions for a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, and a timepiece 1184, payment 1186 or for offering health care (e.g., measuring an exercise quantity, blood sugar level, or the like) or environment information (e.g., atmospheric pressure, humidity, temperature, or the like).

The application 1170 may include an information exchanging application for descriptive convenience) to support information exchange between the electronic device 901 and the electronic device 902 or 904. The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to the electronic device 902 or 904. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the electronic device 902 or 904 which communicates with the electronic device, an application running in the external electronic device, or a service (e.g., a call service, a message service, or the like) provided from the external electronic device.

The application 1170 may include an application (e.g., a health care application of a mobile medical device) that is assigned in accordance with an attribute of the electronic device 902 or 904. The application 1170 may include an application that is received from the server 906 or the electronic device 902 or 904. The application 1170 may include a preloaded application or a third party application that is downloadable from a server. The element titles of the program module 1110 according to the embodiment may be modifiable depending on kinds of operating systems.

At least a part of the program module 1110 may be implemented by software, firmware, hardware, or a combination of two or more thereof. At least a portion of the program module 1110 may be implemented (e.g., executed), for example, by the processor 1010. At least a portion of the program module 1110 may include, for example, modules, programs, routines, sets of instructions, processes, or the like for performing one or more functions.

At least a part of an apparatus (e.g., modules or functions thereof) or a method (e.g., operations) described herein may be implemented by instructions stored in a non-transitory computer-readable storage media in the form of a program module. The instruction, when executed by a processor (e.g., the processor 920), may cause the one or more processors to perform a function corresponding to the instruction. The non-transitory computer-readable storage media, for example, may be the memory 930.

A non-transitory computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., ROM, a RAM, or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

In accordance with the described herein methods and apparatuses, a ghost touch may be removed or disregarded based on a magnitude of a pressure value corresponding to the touch input of a user.

Furthermore, as one control circuit that controls a touch panel and a pressure sensor determines the ghost touch, it may be possible to prevent a decrease in the response speed or the sensitivity of the touch input caused upon removing of the ghost touch.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a display;
a first sensor;
a second sensor; and
a processor configured to:
obtain, using the first sensor, location information corresponding to an active area of the display contacted with an external object, in response to contact between the external object and the display;
obtain, using the second sensor, pressure information corresponding to a pressure applied to the display resulting from the contact between the external object and the display;
determine a validity of the location information based on whether the pressure information satisfies a designated condition; and
one of initialize and calibrate the first sensor if the contact between the external object and the display is invalid.

2. The electronic device of claim 1, wherein the processor is further configured to determine if the contact between the external object and the display is valid based at least upon one of the location information and the pressure information.

3. The electronic device of claim 1, wherein the pressure information is distinguishable from the location information.

4. The electronic device of claim 1, wherein the processor is further configured to synchronize the location information with the pressure information by changing an interrupt period of the second sensor to be equal to an interrupt period of the first sensor.

5. An electronic device comprising:
a touch panel configured to sense a touch input;
a pressure sensor configured to sense a pressure applied by the touch input; and
a processor configured to
process data associated with the touch input received from a control circuit that is electrically connected to the touch panel and the pressure sensor,
obtain coordinates of the touch input and a pressure value corresponding to the touch input,
provide the coordinates to the processor if the pressure value is greater than or equal to a threshold value,
one of initialize and calibrate the touch panel if the pressure value is less than the threshold value, and
synchronizing the coordinates with the pressure value by changing an event processing period of the pressure sensor to be equal to an event processing period of a touch panel.

6. The electronic device of claim 5, wherein the control circuit is further configured to one of discard and remove the coordinates if the pressure value is less than the threshold value.

7. The electronic device of claim 5, wherein the control circuit is further configured to provide the coordinates to the processor using firmware stored in the control circuit if the pressure value is greater than or equal to the threshold value.

8. The electronic device of claim 5, wherein the control circuit is further configured to:
generate three-dimensional coordinates of the touch input using the coordinates and the pressure value; and
provide the three-dimensional coordinates to the processor if the pressure value is greater than or equal to the threshold value.

9. The electronic device of claim 5, further comprising:
a display electrically connected to the processor, which is further configured to output a warning screen on the display if a pressure is sensed by the pressure sensor while calibrating the touch panel.

10. The electronic device of claim 5, further comprising:
a display electrically connected to the processor, which is configured to output a warning screen on the display if a pressure is sensed by the pressure sensor before calibrating the touch panel.

11. The electronic device of claim 5, wherein the control circuit is further configured to:
assign an identification value to the touch input until the touch input is released; and
provide the coordinates of the touch input to the processor if a difference between a first time when the coordinates of the touch input are obtained and a second time when the coordinates of the touch input are obtained is smaller than or equal to a designated time.

12. A user input recognizing method of an electronic device, the method comprising:
- sensing a touch input on a touch panel of the electronic device;
- obtaining coordinates of the touch input and a pressure value corresponding to the touch input;
- if the pressure value is greater than or equal to a threshold value, determining that the coordinates of the touch input are valid, to allow a function corresponding to the touch input to be performed;
- if the pressure value is less than the threshold value, one of initializing and calibrating the touch panel; and
- synchronizing the coordinates with the pressure value by changing an event processing period of a pressure sensor to be equal to an event processing period of a touch panel.

13. The method of claim 12, further comprising:
one of discarding and removing the coordinates if the pressure value is less than the threshold value.

14. The method of claim 12, further comprising:
one of initializing and calibrating a touch panel if the pressure value is less than the threshold value.

15. The method of claim 12, further comprising:
generating three-dimensional coordinates of the touch input using the coordinates and the pressure value,
wherein determining that the coordinates of the touch input are valid comprises: performing a function corresponding to the touch input based on the three-dimensional coordinates if the pressure value is greater than or equal to the threshold value.

* * * * *